(12) United States Patent
Banaszak et al.

(10) Patent No.: US 6,423,421 B1
(45) Date of Patent: Jul. 23, 2002

(54) HEAT SHRINKABLE FILM WITH MULTICOMPONENT INTERPENETRATING NETWORK RESIN

(75) Inventors: Cheryl M. Banaszak, Easley; Blaine C. Childress, Inman, both of SC (US); Adam D. Buccolo, Talbott, TN (US)

(73) Assignee: Sealed Air Corporation, Saddlebrook, NJ (US)

( * ) Notice: Subject to any disclaimer, the term of this patent is extended or adjusted under 35 U.S.C. 154(b) by 0 days.

(21) Appl. No.: 09/564,177

(22) Filed: May 3, 2000

Related U.S. Application Data
(60) Provisional application No. 60/148,445, filed on Aug. 11, 1999.

(51) Int. Cl.[7] .......................... B32B 27/32; B32B 27/30
(52) U.S. Cl. .................. 428/516; 428/500; 428/515; 428/520; 428/910
(58) Field of Search .................. 428/500, 516, 428/520, 910, 515

(56) References Cited

U.S. PATENT DOCUMENTS

| | | | |
|---|---|---|---|
| 4,551,380 A | 11/1985 | Schoenberg | 428/218 |
| 5,272,016 A | 12/1993 | Ralph | 428/516 |
| 5,279,872 A | 1/1994 | Ralph | 428/34.9 |
| 5,283,128 A | 2/1994 | Wilhoit | 428/516 |
| 5,397,640 A | 3/1995 | Georgelos et al. | 428/349 |
| 5,593,747 A | 1/1997 | Georgelos | 428/36.7 |
| 5,604,043 A | 2/1997 | Ahlgren | 428/518 |
| 5,707,751 A | 1/1998 | Garza et al. | 428/515 |
| 5,747,594 A | 5/1998 | DeGroot et al. | 525/240 |
| 5,792,534 A | 8/1998 | DeGroot et al. | 428/36.92 |
| 5,844,045 A | 12/1998 | Kolthammer et al. | 525/240 |
| 5,907,942 A | 6/1999 | Eichbauer | 53/441 |
| 5,914,164 A | 6/1999 | Ciocca et al. | 428/36.7 |
| 5,916,692 A | 6/1999 | Brambilla | 428/516 |
| 6,297,323 B1 | 10/2001 | Bauer et al. | 525/191 |

FOREIGN PATENT DOCUMENTS

| | | |
|---|---|---|
| EP | WO 94/25523 | 11/1994 |
| EP | WO 98/26000 | 6/1998 |
| WO | WO 93/13143 | 7/1993 |
| WO | WO 01/32771 A1 | 5/2001 |

*Primary Examiner*—D. S. Nakarani
(74) *Attorney, Agent, or Firm*—Mark B. Quatt

(57) ABSTRACT

An oriented heat shrinkable film includes a layer including a multicomponent ethylene/alpha-olefin interpenetrating network resin having a melt index less than 1.4, the resin including a homogeneous component having a melt index of less than 1, and a density of at least 0.91 grams/cubic centimeter, and a heterogeneous component with a melt index of between 1.5 and 20; the film having a haze value (ASTM D 1003-95) less than or equal to 5, a peak load/mil value (ASTM D 3763-95a) of at least 155 newtons/mil, and a free shrink (ASTM D 2732-83) at a temperature of 200° F. of at least 8% in either or both of the longitudinal and transverse directions. Films with substantially balanced free shrink are preferred, in particular those with a free shrink balance of less than or equal to 30%. Advantages in downgauging and/or mechanical properties are provided without substantially adversely affecting properties such as free shrink and optics.

29 Claims, 5 Drawing Sheets

HEAT SHRINKABLE FILM WITH MULTICOMPONENT INTERPENETRATING NETWORK RESIN

This application claims the benefit of U.S. Provisional Application No. 60/148,445, filed Aug. 11, 1999.

FIELD OF THE INVENTION

The present invention relates to oriented, heat shrinkable thermoplastic film.

BACKGROUND OF THE INVENTION

For many years, the heat shrinkable films industry has endeavored to reduce film gauge while maintaining performance in response to initiatives associated with source reduction. Lower gauges also allow for increased footage on rolls, which benefits the customer by reducing downtime (changeover time).

However, prior strategies involving films having single resin layers or conventional melt blends of resins, especially linear low density polyethylene (LLDPE), typically resulted in performance concessions. For instance, some improvement in optical quality and percent free shrink may have been seen, but with an undesirable degradation in impact strength. In the case of other blend compositions, good impact resistance and abrasion resistance could be obtained, but with an accompanying degradation in free shrink and clarity.

Thus, the technical challenge remained to design display films with higher impact resistance than LLDPE, but with optical and shrink properties comparable to LLDPE. The inventors have found that the use of a multicomponent ethylene/alpha-olefin interpenetrating network resin (herein "IPN resin") permits property tailoring without compromising clarity, impact resistance, free shrink, or resistance to tear propagation. The result is a stronger, more abuse resistant film having the shrink and optical properties presently provided by LLDPE. These inventive films result in lower failures at a processor's packaging machine, or during distribution of contents. The tensile strength of this film is superior to many conventional films, thereby permitting downgauging. A down-gauged film with performance properties comparable to prior LLDPE formulations at their previous gauge can account for less downtime and changeovers at the customer's plant owing to the above mentioned greater roll footage. The ability to deliver higher value heat shrinkable film without a significant cast premium is a distinct advantage of the films of this invention. Other resins recognized for providing certain performance features (i.e. clarity, seal initiation temperature, low temperature shrink) such as metallocene resins, or blends, cannot provide abrasion resistance, nor deliver low temperature and low haze performance without a substantial cost penalty. The inventors have found that the use of an IPN resin in the skin layer or layers of a multilayer film can result in reduced levels of required antiblocking agent via removal of, or reduction in, the need for ethylene/vinyl acetate copolymer (EVA) in the skin layers. Additive reduction is advantageous because of reduced abrasive damage from inorganic particles, reduced accumulation of wax onto machine and package contents due to transfer from film to contact surfaces, together with better gloss and clarity.

The use of IPN resins thus provides superior mechanical strength properties while preserving excellent optical and shrink values comparable to e.g. D955™ film. These performance attributes can lead to higher performance films at comparable thickness relative to current LLDPE films or to thinner films.

An improved packaging film in accordance with the present invention can thus provide adequate resistance to tear propagation; excellent free shrink; good optics, including haze, clarity, and gloss values; high impact resistance; and high tensile strength.

SUMMARY OF THE INVENTION

In a first aspect, a multilayer oriented heat shrinkable film comprises an internal layer comprising a multicomponent ethylene/alpha-olefin interpenetrating network resin having a melt index less than 1.4, the resin comprising a homogeneous component having a melt index of less than 1, and a density of at least 0.91 grams/cubic centimeter, and a heterogeneous component having a melt index of between 1.5 and 20; and outer layers comprising a polymeric resin; wherein the film has a haze value (ASTM D 1003-95) less than or equal to 5, a peak load/mil value (ASTM D 3763-95a) of at least 155 newtons/mil, and a free shrink (ASTM D 2732-83) at a temperature of 200° F. of at least 8% in either or both of the longitudinal and transverse directions.

In a second aspect, a multilayer oriented heat shrinkable film comprises an internal layer comprising polymeric resin; first and second intermediate layers, each disposed on a respective opposite side of the internal layer, comprising multicomponent ethylene/alpha-olefin interpenetrating network resin having a melt index less than 1.4, the resin comprising a homogeneous component having a melt index of less than 1, and a density of at least 0.91 grams/cubic centimeter, and a heterogeneous component having a melt index of between 1.5 and 20; and first and second outer layers, disposed on the first and second intermediate layers respectively, comprising a polymeric resin; wherein the film has a haze value (ASTM D 1003-95) less than or equal to 5, a peak load/mil value (ASTM D 3763-95a) of at least 155 newtons/mil, and a free shrink (ASTM D 2732-83) at a temperature of 200° F. of at least 8% in either or both of the longitudinal and transverse directions.

In a third aspect, a solid state oriented heat shrinkable film comprises between 50 and 100 percent, by volume of the total film, of a multicomponent ethylene/alpha-olefin interpenetrating network resin having a melt index less than 1.4, the resin comprising a homogeneous component having a melt index of less than 1, and a density of at least 0.91 grams/cubic centimeter, and a heterogeneous component having a melt index of between 1.5 and 20; and between 0 and 50 percent, by volume of the total film, of a polymeric resin; wherein the film has a haze value (ASTM D 1003-95) less than or equal to 5, a peak load/mil value (ASTM D 3763-95a) of at least 155 newtons/mil, and a free shrink (ASTM D 2732-83) at a temperature of 200° F. of at least 8% in either or both of the longitudinal and transverse directions.

In a fourth aspect, a multilayer oriented heat shrinkable film comprises an internal layer comprising a blend of a multicomponent ethylene/alpha-olefin interpenetrating network resin having a melt index less than 1.4, and ethylene polymer or copolymer having a density of at least 0.935 grams/cubic centimeter, wherein the multicomponent ethylene/alpha-olefin interpenetrating network resin having a melt index less than 1.4 comprises a homogeneous component having a melt index of less than 1, and a density of at least 0.91 grams/cubic centimeter, and a heterogeneous component with a melt index of between about 1.0 and 20; and outer layers comprising a polymeric resin; wherein the film has a haze value (ASTM D 1003-95) less than or equal to 5, a peak load/mil value (ASTM D 3763-95a) of at least 155 newtons/mil, and a free shrink (ASTM D 2732-83) at a temperature of 200° F. of at least 8% in either or both of the longitudinal and transverse directions.

Definitions

"Acrylic" herein refers to acrylic or to methacrylic.

"Composite free shrink" herein refers to a value determined by summing the percent free shrink in the longitudinal direction with the percentage free shrink in the transverse direction. For example, Example 1 in Table 3 displays the following values at 200° F.: 17% free shrink in the longitudinal direction, and 19% free shrink in the transverse direction. The composite free shrink would then be 17% +19%, or a value of 36%.

"CRYSTAF" herein refers to an analytical technique which can be used to characterize the composition of a polymer by means of a fractionation scheme based on crystallization isolation. Samples were analyzed by Polymer Char (Valencia Parc Tecnologic, PO Box 176 E-46980, Paterna, Spain). The technique generates results equivalent to that provided from TREF. (see Monrabal (1994) J. Applied Poly. Sci. 52, 491; Soares et al., SPE Polyolefins XI p287-312).

"Ethylene/alpha-olefin copolymer" (EAO) herein refers to copolymers of ethylene with one or more comonomers selected from $C_3$ to $C_{10}$ alpha-olefins such as propene, butene-1,hexene-1, octene-1, etc. in which the molecules of the copolymers comprise long polymer chains with relatively few side chain branches arising from the alpha-olefin which was reacted with ethylene. This molecular structure is to be contrasted with conventional high pressure low or medium density polyethylenes which are highly branched with respect to EAOs and which high pressure polyethylenes contain both long chain and short chain branches. EAO includes such heterogeneous materials as linear medium density polyethylene (LMDPE), linear low density polyethylene (LLDPE), and very low and ultra low density polyethylene (VLDPE and ULDPE), such as DOWLEX™ or ATTANE™ resins supplied by Dow, ESCORENE™ or EXCEED™ resins supplied by Exxon; as well as linear homogeneous ethylene/alpha olefin copolymers (HEAO) such as TAFMER™ resins supplied by Mitsui Petrochemical Corporation, EXACT™ resins supplied by Exxon, or long chain branched (HEAO) AFFINITY™ resins supplied by the Dow Chemical Company, or ENGAGE™ resins supplied by DuPont Dow Elastomers.

"Free shrink balance" herein refers to the value, which defines the percent of difference between the free shrink of a film in the longitudinal direction and the free shrink of the same film in the transverse direction at 240° F., defined by the mathematical relationship:

$$\left[\frac{|FS_{TD} - FS_{LD}|}{FS_{TD}}\right]$$

where:

FS=free shrink

TD=transverse direction

LD=longitudinal direction

Films of the present invention preferably exhibit a free shrink balance of less than or equal to 30%. As an example (see Table 3) the free shrink of Example 1 in the longitudinal direction is 43% at 240° F. The free shrink of Example 1 in the transverse direction is 48% at 240° F. Inserting these values in the above relationship:

$$\left[\frac{|48 - 43|}{48}\right]$$

i.e., the absolute value of 48 minus 43 equals 5, and 5 divided by 48 equals 104, which is equivalent to 10.4%, which is less than 30%.

"Heat shrinkable" herein refers to a property of a material which, when heated to a temperature of 200° F., will exhibit a free shrink (ASTM D 2732-83) of at least 8% in the longitudinal direction, and/or at least 8% in the transverse direction. Heat shrinkable films of this invention are solid state oriented as contrasted to hot blown films which are melt state oriented.

"High density polyethylene" (HDPE) herein refers to a polyethylene having a density of between 0.94 and 0.965 grams per cubic centimeter.

"Intermediate" herein refers to a layer of a multi-layer film which is between an outer layer and an internal layer of the film.

"Internal layer" herein refers to a layer which is not an outer or surface layer, and is typically a central or core layer of a film.

"LD" herein refers to the longitudinal direction, i.e. the direction of the film parallel to the path of extrusion. "TD" herein refers to the transverse direction, i.e. the direction of the film transverse to the path of extrusion.

"Linear low density polyethylene" (LLDPE) herein refers to polyethylene having a density between 0.917 and 0.925 grams per cubic centimeter.

"Linear medium density polyethylene" (LMDPE) herein refers to polyethylene having a density between 0.926 grams per cubic centimeter and 0.939 grams per cubic centimeter.

"Multicomponent ethylene/alpha-olefin interpenetrating network resin" or "IPN resin" herein refers to multicomponent molecular mixtures of polymer chains. Because of molecular mixing, IPN resins cannot be separated without breaking chemical bonds. Polymer chains combined as IPN resins are interlaced at a molecular level and are thus considered true solid state solutions. Interpenetrating networks, unlike blends, become new compositions exhibiting properties distinct from parent constituents. Interpenetrating networks provide phase co-continuity leading to surprising enhancement of physical properties. Due to the mixture of at least two molecular types, these compositions may exhibit bimodal or multimodal curves when analyzed using TREF or CRYSTAF. Interpenetrating networks as herein used includes semi-interpenetrating networks and therefore describes crosslinked and uncrosslinked multi-component molecular mixtures having a low density fraction and a high density fraction. Specific production methods for preparing IPN resins useful for carrying out the present invention, are disclosed in U.S. Pat. No. 5,747,594 (deGroot et al.), U.S. Pat. No. 5,370,940 (Hazlitt et al.), and WO 94/17112 (Kolthammer), all herein incorporated by reference in their entirety. Preferred IPN resins are prepared using a parallel or sequential multiple reactor scheme. Especially preferred IPN resins are produced from a solution polymerization scheme. Alternatively, IPNs useful for the inventive films may be prepared within a single reactor by completing polymerization of the heterogeneous component prior to initiating the polymerization of the homogeneous component. Examples of catalysts suitable for preparing the heterogeneous component are described in U.S. Pat. Nos. 4,314,912 (Lowery et al.), U.S. Pat. No. 4,547,475 (Glass et al.), and U.S. Pat. No. 4,612,300 (Coleman, III); examples of catalysts suitable for producing the homogeneous component are described in U.S. Pat. Nos. 5,026,798 and 5,055,438 (Canich); 3,645,992(Elston); 5,017,714 (Welborn); and 4,076,698 (Anderson); all herein incorporated by reference in their entirety.

"Outer layer" herein refers to what is typically an outermost, usually surface layer or skin layer of a multi-layer film, although additional layers, coatings, and/or films can be adhered to it.

"Polymer" herein refers to homopolymer, copolymer, terpolymer, etc. "Copolymer" herein includes copolymer, terpolymer, etc.

"Solid-state orientation" herein refers to the orientation process carried out at a temperature higher than the highest $T_g$ (glass transition temperature) of resins making up the majority of the structure and lower than the highest melting point, of at least some of the film resins, i.e. at a temperature at which at least some of the resins making up the structure are not in the molten state. Solid state orientation may be contrasted to "melt state orientation" i.e. including hot blown films, in which stretching takes place immediately upon emergence of the molten polymer film from the extrusion die.

"Solid state oriented" herein refers to films obtained by either coextrusion or extrusion coating of the resins of the different layers to obtain a primary thick sheet or tube (primary tape) that is quickly cooled to a solid state to stop or slow crystallization of the polymers, thereby providing a solid primary film sheet, and then reheating the solid primary film sheet to the so-called orientation temperature, and thereafter biaxially stretching the reheated film sheet at the orientation temperature using either a tubular solid-state orientation process (for example a trapped bubble method) or using a simultaneous or sequential tenter frame process, and finally rapidly cooling the stretched film to provide a heat shrinkable film. In the trapped bubble solid state orientation process the primary tape is stretched in the transverse direction (TD) by inflation with air pressure to produce a bubble, as well as in the longitudinal direction (LD) by the differential speed between the two sets of nip rolls that contain the bubble. In the tenter frame process the sheet or primary tape is stretched in the longitudinal direction by accelerating the sheet forward, while simultaneously or sequentially stretching in the transverse direction by guiding the heat softened sheet through a diverging geometry frame.

"Substantially balanced free shrink" herein refers to film of the invention characterized by a free shrink balance less than or equal to 30%. As an example, Example 1 was calculated above as having a free shrink balance of 10.4% at 240° F. Since this value is less than or equal to 30%, Example 1 has a substantially balanced free shrink at 240° F.

All compositional percentages used herein are presented on a "by weight" basis, unless designated otherwise.

BRIEF DESCRIPTION OF THE DRAWINGS

A detailed description of preferred embodiments of the invention follows, with reference to the attached drawings, wherein.

DETAILED DESCRIPTION OF THE INVENTION

Figure 1:
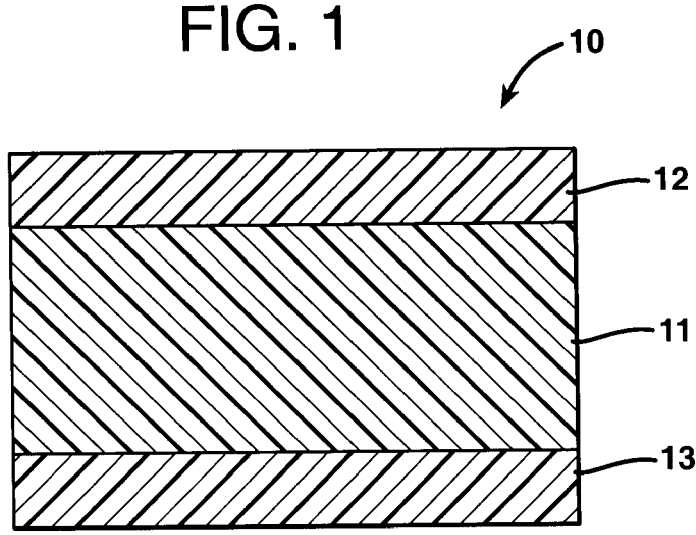
FIG. 1 is a cross-sectional view of a three layer film.

Referring to FIG. 1, a film 10 comprises an internal layer 11, a first outer layer 12, and a second outer layer 13. Outer layers 12 and 13 are preferably surface or skin layers.

Internal layer 11 comprises an IPN resin having a melt index less than 1.4. Internal layer 11 comprises at least 35%, preferably at least 50%, and more preferably at least 55% by volume of the film structure. Internal layer 11 comprises between 35 and 98%, preferably between 60 and 98%, and more preferably between 65 and 98% by volume of the film structure, more preferably between 70 and 98% by volume of the film structure.

Preferably, the multicomponent ethylene/alpha-olefin interpenetrating network resin having a melt index less than 1.4 is derived from a solution mixture of homogeneous ethylene/alpha-olefin and heterogeneous ethylene/alpha-olefin, or is produced from a solution polymerization of homogeneous ethylene/alpha-olefin and solvent combined with a solution polymerized heterogeneous ethylene/alpha-olefin. The homogeneous ethylene/alpha-olefin component is preferably long chain branched.

Internal layer 11 can further comprise a polymeric resin such as ethylene/alpha olefin copolymer, ethylene/vinyl acetate copolymer, ethylene/alkyl acrylate copolymer, ethylene/acrylic acid copolymer, ionomer, propylene polymer or copolymer, butylene polymer or copolymer, a second multicomponent ethylene/alpha-olefin interpenetrating network resin, high density polyethylene, or ethylene polymer or copolymer having a density of at least 0.935 grams/cubic centimeter.

First and second outer layers 12 and 13 respectively each comprise a polymeric resin, and preferably ethylene/alpha olefin copolymer; ethylene/vinyl acetate copolymer; ethylene/alkyl acrylate copolymer; ethylene/(meth)acrylic acid copolymer; ionomer; propylene polymer and copolymer; butylene polymer and copolymer; IPN resin different in composition from the multicomponent ethylene/alpha-olefin interpenetrating network resin of the internal layer; a blend of the IPN resin of the internal layer with another polymeric resin, such as those identified herein; or a blend of any of these materials. The ethylene/alpha-olefin copolymer can have a density of between 0.86 and 0.96, preferably between 0.90 and 0.95, more preferably between 0.91 and 0.94, and most preferably between 0.915 and 0.940 grams/cubic centimeter. Where the polymeric resin of the first and second outer layers 12 and 13 comprises an IPN resin, this resin is preferably different in composition from the IPN resin of the internal layer 11. The difference between the IPN resin of the internal layer and the IPN resin of the outer layers will typically be a difference in composition, but the difference can instead, or in addition, be a difference in one or more physical properties, amount or type of additives, degree of crosslinking, or the like. Typically, non-compositional differences, for example in physical properties, will be a manifestation of compositional differences.

Outer layers 12 and 13 are preferably identical, but can differ from each other in composition, one or more physical properties, amount or type of additives, degree of crosslinking, or the like. For example, layer 12 can comprise an ethylene/vinyl acetate with 6% vinyl acetate, while layer 13 can comprise an ethylene/vinyl acetate with 9% vinyl acetate. As another example, layer 12 can comprise an ethylene/vinyl acetate with 6% vinyl acetate, while layer 13 can comprise an ethylene/alpha-olefin copolymer. Layers 12 and 13 can also differ in composition, the difference created by the presence or amount of a blend of two or more resins. As an example, layer 12 can comprise an IPN resin like that of internal layer 11, and layer 13 can comprise a blend of the IPN resin of the internal layer with another polymeric resin such as one of those disclosed herein. Film structures in accordance with the invention can thus be depicted as A/B/A or as A/B/C, where A, B, and C each represent a distinct layer of a multilayer film. It may sometimes be desirable to include IPN resin in one or both of the outer layers to improve abrasion resistance or provide some other functionality to the film.

In an alternative embodiment (see FIG. 2), a film 20 comprises an internal layer 26, first outer layer 22, second outer layer 23, first intermediate layer 24, and second intermediate layer 25.

The internal layer 26, and outer layers 22 and 23, can comprise any of the materials disclosed above for layers 12 and 13 of FIG. 1.

Intermediate layers 24 and 25 each comprise IPN resin, and optionally an additional polymeric resin, as disclosed for internal layer 11 of FIG. 1.

Figure 2:
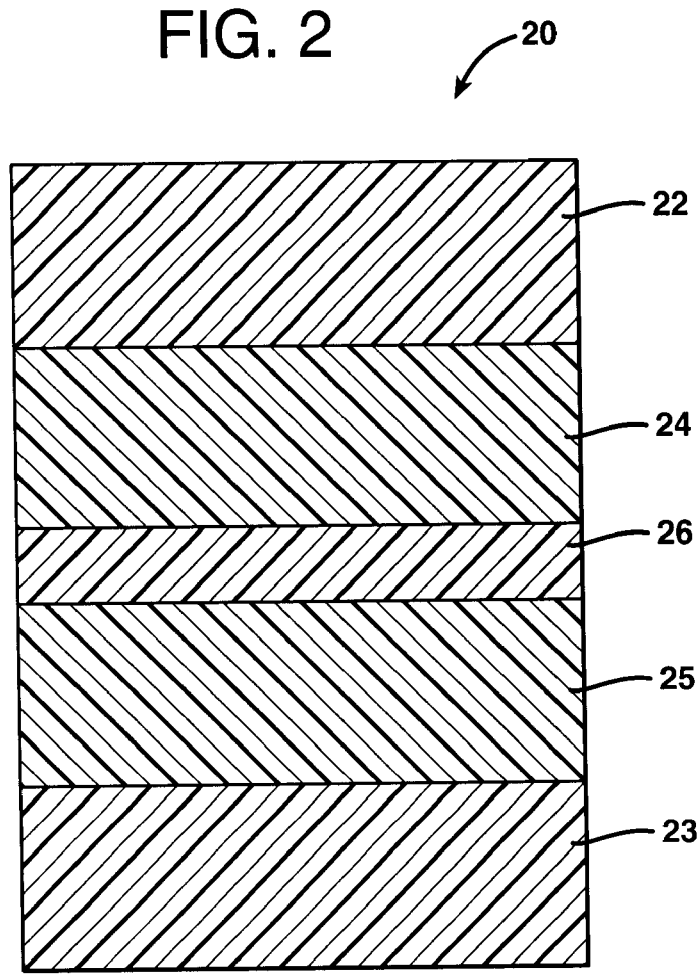
FIG. 2 is a cross-sectional view of a five layer film.
Figure 3:
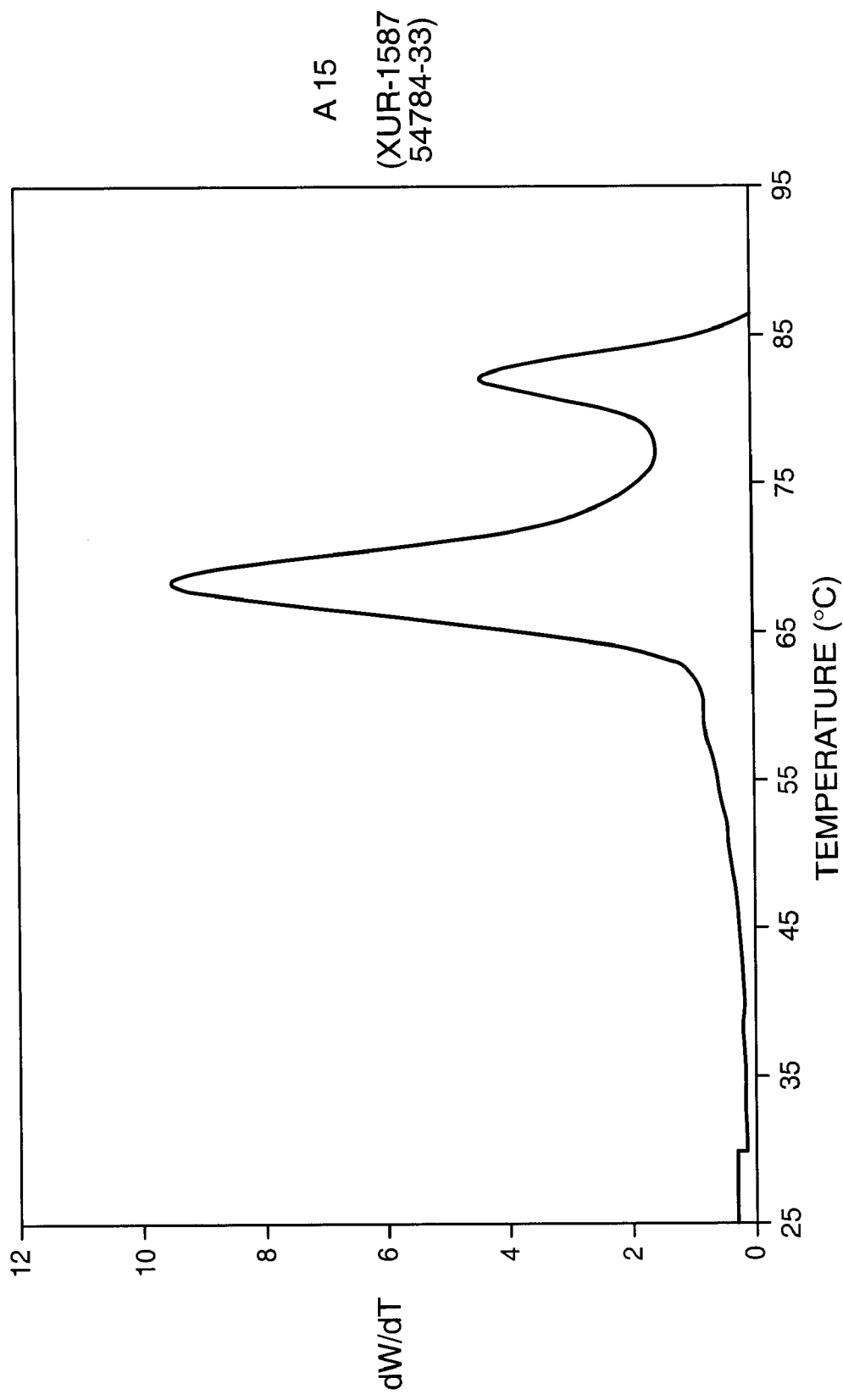
FIG. 3 is a CRYSTAF curve of an IPN resin suitable for use in the films of this invention.
Figure 4:
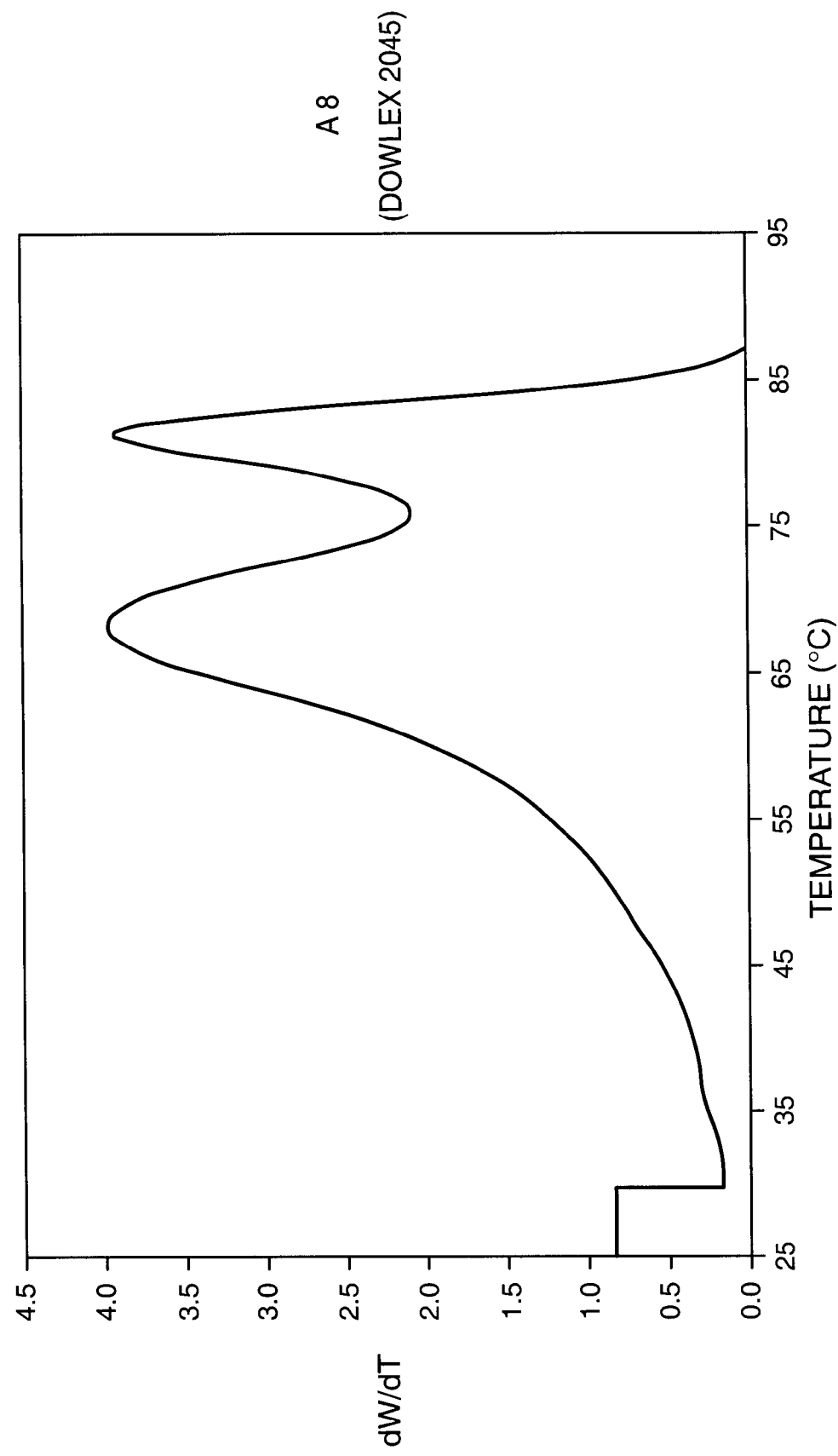
FIG. 4 is a CRYSTAF curve of a LLDPE resin representing a prior art film resin.
Figure 5:
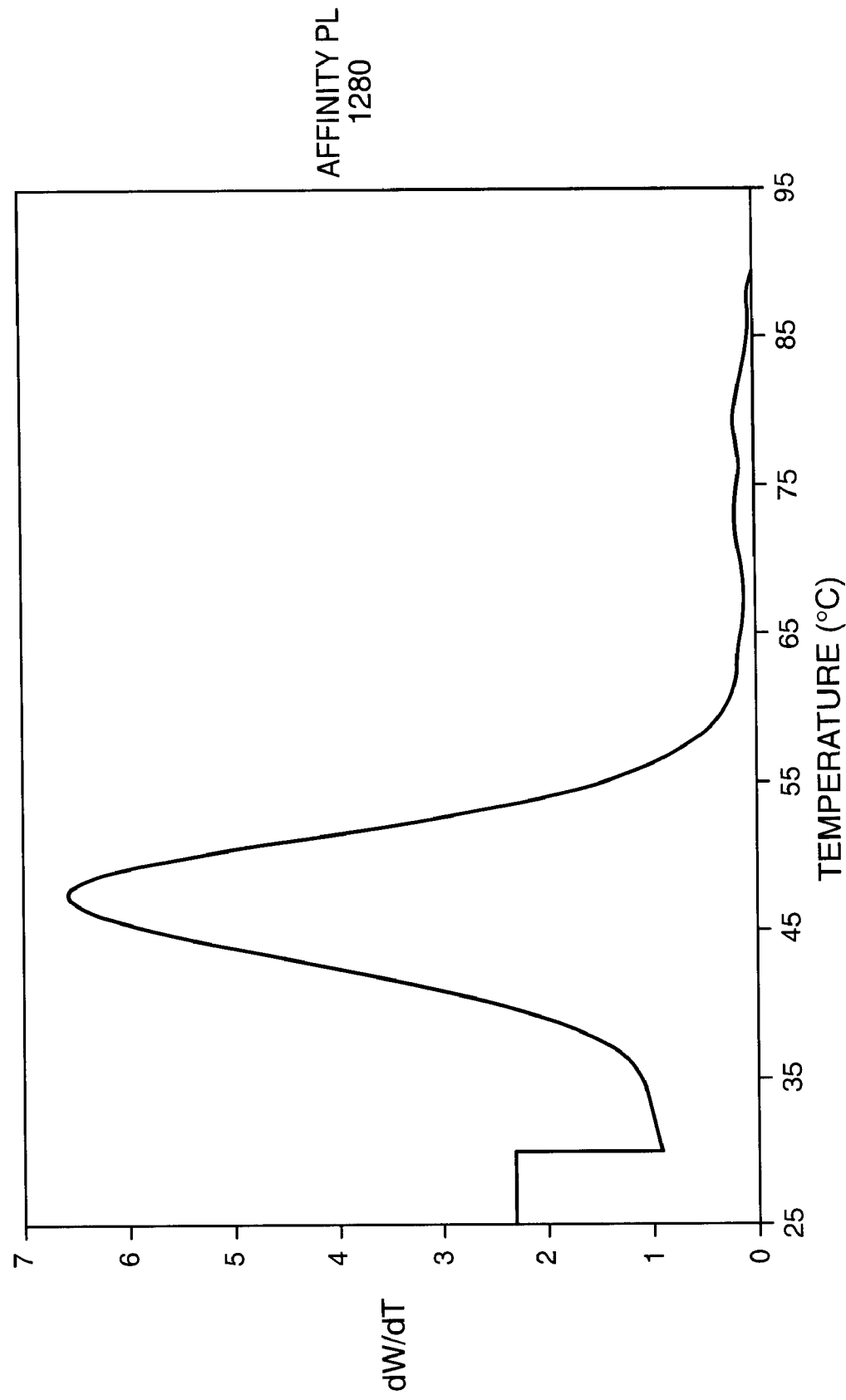
FIG. 5 is a CRYSTAF curve of a metallocene catalyzed resin.
Figure 6:
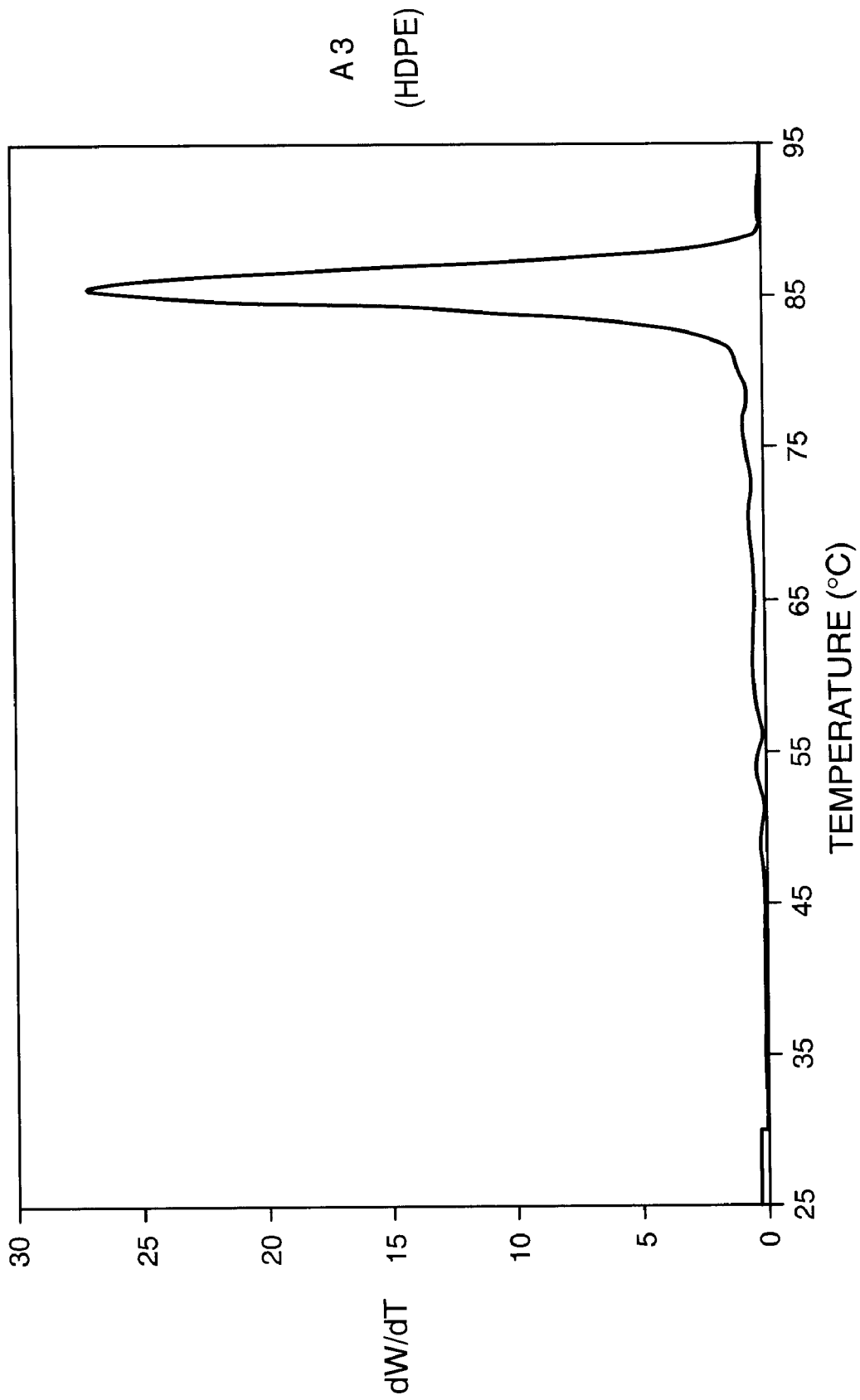
FIG. 6 is a CRYSTAF curve of a high density polyethylene resin.

Thus, FIG. 2 represents a five layer embodiment in which the internal layer 11 of FIG. 1 is effectively "split" into two layers 24 and 25.

In a second alternative embodiment, a solid state oriented heat shrinkable film comprises between 50 and 100 percent, by volume of the total film, of a multicomponent ethylene/alpha-olefin interpenetrating network resin having a melt index less than 1.4, the resin comprising a homogeneous component having a melt index of less than 1, and a density of at least 0.91 grams/cubic centimeter, and a heterogeneous component with a melt index of between 1.5 and 20; and between 0 and 50 percent, by volume of the total film, of a polymeric resin; wherein the film has a haze value (ASTM D 1003-95) less than or equal to 5, a peak load/mil value (ASTM D 3763-95a) of at least 155 newtons/mil, and a free shrink (ASTM D 2732-83) at a temperature of 200° F. of at least 8% in either or both of the longitudinal and transverse directions. The film is preferably a multilayer film. The polymeric resin is preferably different in composition from the multicomponent ethylene/alpha-olefin interpenetrating network resin having a melt index less than 1.4. The film preferably has a substantially balanced free shrink. Preferably, at least 50% by volume of the total film volume comprises a multicomponent ethylene/alpha-olefin interpenetrating network resin having a melt index less than 1.4. Preferably, the film comprises greater than 0%, more preferably greater than 0.1 %, such as greater than 1 %, greater than 5%, or greater than 10% by volume of the total film, of the polymeric resin; and less than 100%, more preferably less than 99.9%, such as less than 99%, less than 95%, or less than 90%, by volume of the total film, of the multicomponent ethylene/alpha-olefin interpenetrating network resin having a melt index less than 1.4.

The polymeric resin can comprise ethylene/alpha olefin copolymer, ethylene/vinyl acetate copolymer, ethylene/alkyl acrylate copolymer, ethylene/acrylic acid copolymer, ionomer, propylene polymer and copolymer, and butylene polymer and copolymer,.

Preferred films of the invention have substantially balanced free shrink.

Referring to FIGS. 3 to 6, the CRYSTAF curves indicate the single chemical type present in a metallocene catalyzed single site resin or a high density resin as well as the mixture of molecules present in a heterogeneous LLDPE or an IPN resin.

Table 1 identifies the materials used in the examples and comparative examples. The remaining tables describe the formulations and/or properties of films made with these materials.

TABLE 1

| Material Code | Tradename or Designation | Source(s) |
|---|---|---|
| A1 | XUR-1567-54784-30 | Dow |
| A2 | EXACT ™ SLX-9103 | Exxon |
| A3 | HiD 9659 ™ | Chevron |
| A4 | ENGAGE ™ 8150 | DuPont Dow Elastomers |
| A5 | ATTANE ™ 4201 | Dow |
| A6 | AFFINITY ™ SL 1170 | Dow |
| A7 | ELITE ™ 5200 | Dow |
| A8 | DOWLEX ™ 2045.04 | Dow |
| A9 | DOWLEX ™ 2037 | Dow |
| A10 | PE 1335 ™ | Huntsman |
| A11 | TAFMER ™ A4085 | Mitsui |
| A12 | EXACT ™ 4011 | Exxon |
| A13 | ESCORENE ™ LD-318.92 | Exxon |
| A14 | XUR-1567-54453-104 | Dow |
| A15 | XUR-1567-54784-33 | Dow |
| A16 | ELITE ™ 5100 | Dow |
| A17 | ELITE ™ 5110 | Dow |
| A18 | — | Dow |

A1 is an IPN resin with a density of 0.92 grams/cc, and a melt index of 0.75.
A2 is a single site catalyzed ethylene/1-hexene/1-butene terpolymer with a density of 0.901 grams/cc, and a melt index of 2.0.
A3 is high density polyethylene with a density of 0.9625 grams/cc, and a melt index of 1.0.
A4 is an ethylene/1-octene elastomer with a density of 0.887 grams/cc, and a melt index of 0.5.
A5 is an ethylene/1-octene copolymer with a density of 0.912 grams/cc, and a melt flow index of 1.0.
A6 is an IPN resin with a density of 0.912 grams/cc, and a melt flow index of 1.5.
A7 is an IPN resin with a density of 0.917 grams/cc, and a melt flow index of 4.0.
A8 is LLDPE, which in this case is an ethylene/1-octene copolymer with a density of 0.920 gm/cc and an octene-1 comonomer content of 6.5%.
A9 is LMDPE, which in this case is an ethylene/1-octene copolymer with a density of 0.935 gm/cc, and an octene-1 comonomer content of 2.5%.
A10 is ethylene/vinyl acetate copolymer with 3.3% vinyl acetate monomer, and a melt index of 2.0.
A11 is an ethylene/1-butene elastomer with a density of 0.88 grams/cc, and a melt index of 3.6.
A12 is a n ethylene/1-butene elastomer with a density of 0.88 grams/cc, and a melt index of 2.2.
A13 is ethylene/vinyl acetate copolymer with 9% vinyl acetate monomer, and a melt index of 2.0.
A14 is an IPN resin with a density of 0.921 grams/cc, and a melt index of 0.76.
A15 is an IPN resin with a density of 0.924 grams/cc, and a melt index of 0.88.
A16 is an IPN resin with a density of 0.920 grams/cc, and a melt index of 0.85.
A17 is an IPN resin with a density of 0.9255 grams/cc, and a melt index of 0.85.
A18 is an IPN resin with a density of 0.925 grams/cc, and a melt index of 0.88.
Materials A1, A14, A15, and A18 are further characterized in Table 1A.

TABLE 1A

|  | A14 | A1 | A15 | A18 |
|---|---|---|---|---|
| First Component |  |  |  |  |
| polymer split (%) | 50 | 45 | 50 | 44 |
| catalyst type | CGC | CGC | CGC | CGC |
| comonomer type | 1-octene | 1-octene | 1-octene | 1-octene |
| $I_2$ melt Index, g/10 min. | 0.4 | 0.3 | 0.2 | 0.2 |
| density, g/cc | 0.913 | 0.910 | 0.915 | 0.915 |

TABLE 1A-continued

|  | A14 | A1 | A15 | A18 |
|---|---|---|---|---|
| GPC $M_w/M_n$ | 1.8–2.8 | 1.8–2.8 | 1.8–2.8 | 1.8–2.8 |
| Second Component |  |  |  |  |
| polymer split (%) | 50 | 55 | 50 | 56 |
| catalyst type | HEC | HEC | HEC | HEC |
| comonomer type | 1-octene | 1-octene | 1-octene | 1-octene |
| $I_2$ melt Index, g/10 min. | 1.3 | 2.1 | 10.0 | 5.0 |
| density, g/cc | 0.929 | 0.9285 | 0.931 | 0.930 |
| Polymer Composition |  |  |  |  |
| $I_2$ melt Index, g/10 min. | 0.76 | 0.75 | 0.88 | 0.88 |
| density, g/cc | 0.921 | 0.92 | 0.924 | 0.924 |
| GPC $M_w/M_n$ | 2.76 | 2.7 | 3.6 | 3.6 |
| $I_{10}/I_2$ | 6.9 | 7.2 | 7.6 | 7.6 |

These materials are manufactured by Dow Chemical Company in a continuous two-reactor solution polymerization system.

"CGC"= constrained geometry catalyst system.

"HEC"= Ziegler heterogeneous high efficiency catalyst system.

"GPC"= gel permeation chromatography.

EXAMPLES

Examples 1 to 5 of the invention, and the comparative examples ("Co." in the Tables) discussed below, had the structures shown in the Tables, and were each made by a tubular coextrusion of the layers, except that Comparative Examples 10 and 11 (Table 4) were monolayer extruded films. Example 6 is made by a tubular coextrusion of the layers. Physical property values for Example 6 of Table 6 are predicted values.

In the Tables:

\* Could not be coextruded.

\*\* These numbers showed a standard deviation of greater than 20% of the average value.

$^t$ could not be oriented.

$^{tt}$ Natural Centerfold (NCF) line.

$^{ttt}$ TM LONG™ stretcher.

"gmf"=grams force

"n"=newton

"J"=Joule

"mil"=0.001 inches

Methodology for generating the physical properties are as indicated in the superscripts in the Tables, corresponding to the following ASTM tests:

[1] ASTM D 882-95 ("Modulus" in the Tables refers to Tensile Modulus).

[2] ASTM D 1938.

[3] ASTM D 2732-83

[4] ASTM D 3763-95a

[4a] Values from instrumented impact Peak Load were found via ASTM D 3763-95a. Values per mil were calculated by normalizing peak load value to gauge.

[4b] Values from instrumented impact Energy To Break were found via ASTM D 3763-95a. Values per mil were calculated by normalizing energy to break value to gauge.

[5] ASTM D 1003-95

[6] ASTM D 1746-92

[7] ASTM D 2457-90

[8] ASTM D 2838-95

"Melt Index" herein is with reference to ASTM D 1238-90, Condition 190/2.16.

TABLE 2

| Example |  | Co. 1 | Co. 2 | Co. 3 | Co. 4 | Co.5* |
|---|---|---|---|---|---|---|
| Layer Ratio |  | 15/70/15 | 15/70/15 | 15/70/15 | 15/70/15 | 15/70/15 |
| Skins |  | 50% A8 + 25% A9 + 25% A10 | 50% A8 + 25% A9 + 25% A10 | 50% A8 + 25% A9 + 25% A10 | 50% A8 + 25% A9 + 25% A10 | 50% A8 + 25% A9 + 25% A10 |
| Internal |  | A1 | 60% A2 + 40% A3 | 50% A4 + 50% A5 | A6 | A7 |
| Tensile, LD[1] | (psi) | 21931 | 18297 | 12933 | 15459 | — |
| Tensile, TD[1] | (psi) | 20687 | 18982 | 9657 | 16225 | — |
| Elongation, LD[1] | (%) | 132 | 109 | 99 | 114 | — |
| Elongation, TD[1] | (%) | 118 | 82 | 88 | 112 | — |
| Modulus[1], LD | (psi) | 50640 | 56470 | 25970 | 39620 | — |
| Modulus[1], TD | (psi) | 51650 | 62370 | 22030 | 40890 | — |
| LD Tear[2] |  |  |  |  |  |  |
| Tear, Average | (gmf) | 5.96 | 4.54 | 11.8 | 8.8 | — |
| Tear, Maximum | (gmf) | 7.38 | 5.77 | 20.25** | 10.58 | — |
| Energy to Break | (gmf-in) | 10.16 | 7.73 | 20.76 | 14.57 | — |
| Gauge | (mil) | 0.6 | 0.565 | 0.575 |  | — |
| TD Tear[2] |  |  |  |  |  |  |
| Tear, Average | (gmf) | 5.22 | 3.98 | 30.5** | 10.3 | — |
| Tear, Maximum | (gmf) | 8.89 | 5.19 | 57.76** | 14.47 | — |
| Energy to Break | (gmf-in) | 8.58 | 7.02 | 45.25** | 18.43 | — |
| Gauge | (mil) | 0.585 | 0.555 | 0.575 | 0.66 | — |
| Free Shrink[3] |  |  |  |  |  |  |
| 200F-LD | (%) | 12 | 15 | 21 | 13 | — |
| 200F TD | (%) | 17 | 23 | 25 | 19 | — |
| 220F-LD | (%) | 23 | 27 | 41 | 27 | — |
| 220F-TD | (%) | 34 | 39 | 46 | 35 | — |
| 240F-LD | (%) | 49 | 57 | 66 | 64 | — |
| 240F-TD | (%) | 57 | 63 | 70 | 68 | — |
| 260F-LD | (%) | 79 | 75 | 77 | 79 | — |

TABLE 2-continued

| Example | | Co. 1 | Co. 2 | Co. 3 | Co. 4 | Co.5* |
|---|---|---|---|---|---|---|
| 260F-TD | (%) | 78 | 76 | 75 | 77 | — |
| 280F-LD | (%) | 80 | 79 | 77 | 79 | — |
| 280F-TD | (%) | 79 | 79 | 76 | 77 | — |
| Instrumented Impact[4] | | | | | | |
| Peak Load | (N) | 91.48 | 79.89 | 43.44 | 67.94 | — |
| Energy to Break | (J) | 0.78 | 0.58 | 0.28 | 0.51 | — |
| Gauge | (mil) | 0.675 | 0.58 | 0.455 | 0.635 | — |
| Peak Load/Mil[4a] | (N/mil) | 135.5 | 137.7 | 95.5 | 107.0 | — |
| Energy to Break Per Mil[4b] | (J/mil) | 1.16 | 1.00 | 0.62 | 0.80 | — |
| Haze[5] | (%) | 3.5 | 4.0 | 4.0 | 3.7 | — |
| Clarity[6] | (%) | 80.2 | 77.9 | 74.1 | 80.0 | — |
| Gloss[7] | (%) | 85.0 | 85.0 | 82.0 | 86.0 | — |
| Gauge | (mil) | 0.69 | 0.59 | 0.54 | 0.63 | — |

TABLE 3

| Example | | 1 | Co. 6 | Co. 7 | Co. 8 | Co. 9[†] |
|---|---|---|---|---|---|---|
| Layer Ratio | | 15/70/15 | 15/70/15 | 1/2/1 | 15/70/15 | 15/70/15 |
| Skins | | 50% A1 + 25% A9 + 25% A10 | 50% A8 + 25% A9 + 25% A10 | 50% A8 + 25% A9 + 25% A10 | 50% A8 + 25% A9 + 25% A10 | 50% A8 + 25% A9 + 25% A10 |
| Internal | | A1 | A8 | A8 | A13 | A3 |
| Tensile, LD | (psi) | 20387 | 18254 | 17681 | 13867 | — |
| Tensile, TD | (psi) | 24548 | 20850 | 18583 | 12065 | — |
| Elongation, LD | (%) | 92 | 78 | 88 | 90 | — |
| Elongation, TD | (%) | 124 | 127 | 124 | 66 | — |
| Modulus, LD | (psi) | 52910 | 53610 | 59573 | 23790 | — |
| Modulus, TD | (psi) | 62840 | 56730 | 64097 | 28640 | — |
| LD Tear | | | | | | |
| Tear, Average | (gmf) | 3.24 | 3.85 | 4.15 | 3.87 | — |
| Tear, Maximum | (gmf) | 3.96 | 4.33 | | 6.1 | — |
| Energy to Break | (gmf-in) | 5.48 | 6.92 | | 6.33 | — |
| Gauge | (mil) | 0.645 | 0.635 | 0.6 | 0.55 | — |
| TD Tear | | | | | | |
| Tear, 1Average | (gmf) | 4.64 | 4.93 | 5.625 | 3.56** | — |
| Tear, Maximum | (gmf) | 5.34 | 6.29 | | 6.41** | — |
| Energy to Break | (gmf-in) | 8.54 | 8.22 | | 5.66** | — |
| Gauge | (mil) | 0.64 | 0.63 | 0.6 | 0.51 | — |
| Free Shrink | | | | | | |
| 200F-LD | (%) | 17 | 15 | 14 | 26 | — |
| 200F TD | (%) | 19 | 18 | 17 | 35 | — |
| 220F-LD | (%) | 24 | 21 | 19 | 62 | — |
| 220F-TD | (%) | 28 | 28 | 27 | 65 | — |
| 240F-LD | (%) | 43 | 43 | 40 | 72 | — |
| 240F-TD | (%) | 48 | 50 | 47 | 73 | — |
| 260F-LD | (%) | 79 | 79 | 77 | 80 | — |
| 260F-TD | (%) | 75 | 76 | 73 | 79 | — |
| 280F-LD | (%) | 82 | 81 | 82 | 81 | — |
| 280F-TD | (%) | 77 | 77 | 77 | 80 | — |
| Instrumented Impact | | | | | | |
| Peak Load | (N) | 111.16 | 91.66 | 90.94 | 49.91 | — |
| Energy to Break | (J) | 1.14 | 0.85 | 0.758 | 0.35 | — |
| Gauge | (mil) | 0.635 | 0.625 | 0.6 | 0.555 | — |
| Peak Load Per Mil | (N/mil) | 175.1 | 146.7 | 151.6 | 89.9 | — |
| Energy to Break Per Mil | (J/mil) | 1.80 | 1.36 | 1.26 | 0.63 | — |
| Haze | (%) | 3.5 | 3.1 | 3.3 | 5.0 | — |
| Clarity | (%) | 75.6 | 81.0 | 77.8 | 65.8 | — |
| Gloss | (%) | 87.2 | 90.3 | 85.1 | 86.0 | — |
| Gauge | (mil) | | | | 0.58 | — |

TABLE 4

| Example | | 2 | Co. 10 | Co. 11 | 3 |
|---|---|---|---|---|---|
| Layer Ratio | | 15/70/15 | 15/70/15 | 15/70/15 | |
| Skins | | 20% A9 + 80% A1 | 15% A11 + 42.5% A5 + 42.5% A10 | 36% A12 + 27% A5 + 37% A10 | None |
| Internal | | A1 | A1 | A1 | A1 |
| Tensile, LD | (psi) | 22086 | 18835 | 19456 | 22078 |
| Tensile, TD | (psi) | 24251 | 21684 | 19112 | 23162 |
| Elongation, LD | (%) | 116 | 113 | 131 | 114 |
| Elongation, TD | (%) | 102 | 130 | 122 | 90 |
| Tensile Modulus, LD | (psi) | 43840 | 31030 | 27920 | 49720 |
| Tensile Modulus, TD | (psi) | 45320 | 29550 | 36870 | 60890 |
| LD Tear | | | | | |
| Tear, Average | (gmf) | 4.2 | 3.84 | 3.51 | 4.66 |
| Tear, Maximum | (gmf) | 4.73 | 4.51 | 4.14 | 5.24 |
| Energy to Break | (gmf-in) | 7.35 | 7.01 | 6.39 | 8.3 |
| Gauge | (mil) | 0.62 | 0.595 | 0.615 | 0.59 |
| TD Tear | | | | | |
| Tear, Average | (gmf) | 3.06** | 4.26 | 3.47 | 4.27** |
| Tear, Maximum | (gmf) | 5.21** | 5.54 | 5.2** | 5.49 |
| Energy to Break | (gmf-in) | 3.44** | 7.59 | 6.6** | 7.73** |
| Gauge | (mil) | 0.56 | 0.645 | 0.6 | 0.62 |
| Free Shrink | | | | | |
| 200F-LD | (%) | 15 | 14 | 14 | 14 |
| 200F TD | (%) | 18 | 17 | 18 | 17 |
| 220F-LD | (%) | 27 | 30 | 27 | 26 |
| 220F-TD | (%) | 33 | 37 | 33 | 33 |
| 240F-LD | (%) | 62 | 64 | 58 | 64 |
| 240F-TD | (%) | 66 | 66 | 65 | 67 |
| 260F-LD | (%) | 78 | 80 | 79 | 80 |
| 260F-TD | (%) | 83 | 80 | 80 | 79 |
| 280F-LD | (%) | 80 | 79 | 79 | 80 |
| 280F-TD | (%) | 84 | 80 | 79 | 79 |
| Instrumented Impact^II | | | | | |
| Peak Load | (N) | 98.71 | 97.21 | 90.45 | 93.96 |
| Energy to Break | (J) | 0.85 | 0.94 | 0.79 | 0.94 |
| Gauge | (mil) | 0.53 | 0.655 | 0.5675 | 0.56 |
| Peak Load Per Mil | (N/mil) | 186.2 | 148.4 | 159.4 | 167.8 |
| Energy To Break Per Mil | (J/mil) | 1.60 | 1.44 | 1.39 | 1.68 |
| Instrumented Impact^III | | | | | |
| Peak Load | (N) | | | | 97.27 |
| Energy To Break | (J) | | | | 1.09 |
| Gauge | (mil) | | | | 0.71 |
| Peak Load Per Mil | (N/mil) | | | | 137.0 |
| Energy To Break Per Mil | (J/mil) | | | | 1.54 |
| Haze | (%) | 2.8 | 6.0 | 5.0 | 0.4 |
| Clarity | (%) | 83.5 | 70.8 | 68.1 | 89.3 |
| Gloss | (%) | 87.0 | 76.0 | 77 | 96.0 |
| Gauge | (mil) | 0.49 | 0.61 | 0.53 | 0.57 |

TABLE 5

| Examples | | 4 |
|---|---|---|
| Layer Ratio | | 15/70/15 |
| Skins | | 50% A14 + 25% A9 + 25% A10 |
| Internal | | 90% A14 + 10% HDPE |
| Tensile, LD | (psi) | 25009 |
| Tensile, TD | (psi) | 25401 |
| Elongation, LD | (%) | 118 |
| Elongation, TD | (%) | 101 |
| Modulus, LD | (psi) | 70970 |
| Modulus, TD | (psi) | 79360 |
| LD Tear | | |
| Tear, Average | (gmf) | 4.5 |
| Tear, Maximum | (gmf) | 5.19 |
| Energy to Break | (gmf-in) | 8.48 |
| Gauge | (mil) | 0.655 |
| TD Tear | | |
| Tear, Average | (gmf) | 6.37 |
| Tear, Maximum | (gmf) | 12.69 |
| Energy to Break | (gmf-in) | 11.5 |
| Gauge | (mil) | 0.66 |
| Free Shrink | | |
| 200F-LD | (%) | 12 |
| 200F TD | (%) | 15 |
| 220F-LD | (%) | 22 |
| 220F-TD | (%) | 26 |
| 240F-LD | (%) | 45 |
| 240F-TD | (%) | 51 |
| Instrumented Impact | | |
| Peak Load | (N) | 111.65 |
| Energy to Break | (J) | 1.08 |
| Gauge | (mil) | 0.61 |
| Peak Load Per Mil | (N/mil) | 183.0 |
| Energy To Break Per Mil | (J/mil) | 1.77 |
| Haze | (%) | 2.7 |
| Clarity | (%) | 84.5 |
| Gloss | (%) | 87 |
| Gauge | (mil) | 0.60 |

TABLE 6

| Example | | Co. 12 | 5 | 6 |
|---|---|---|---|---|
| Layer Ratio | | 15/70/15 | 15/70/15 | 15/70/15 |
| Skins | | 50% A9 + 50% A10 | 50% A9 + 50% A10 | 50% A8 + 25% A9 + 25% A10 |
| Internal | | A8 | A15 | A18 |
| Gauge | | 60 | 60 | 60 |
| Tensile, LD | (psi) | 20103 | 20500 | 21000 |
| Tensile, TD | (psi) | 23374 | 24099 | 23500 |
| Elongation, LD | (%) | 118 | 122 | 120 |
| Elongation, TD | (%) | 95 | 89 | 90 |
| Tensile Modulus, LD | (psi) | 52050 | 49150 | 48000 |
| Tensile Modulus, TD | (psi) | 58800 | 57560 | 51000 |
| LD Tear | | | | |

TABLE 6-continued

| Example | | Co. 12 | 5 | 6 |
|---|---|---|---|---|
| Tear, Average | (gmf) | 4.9 | 3.9 | 4.0 |
| Tear, Maximum | (gmf) | 5.53 | 4.48 | — |
| Energy to Break | (gmf-in) | 8.63 | 7.28 | — |
| Gauge | (mil) | 0.62 | 0.59 | 0.60 |
| TD Tear | | | | |
| Tear, Average | (gmf) | 4.52** | 2.39 | 4.0 |
| Tear, Maximum | (gmf) | 5.72** | 2.96 | — |
| Energy to Break | (gmf-in) | 8.36** | 4.24** | — |
| Gauge | (mil) | 0.61 | 0.59 | 0.60 |
| Shrink Tension-LD[8] | | | | |
| 200F | (psi) | 316.82 | 313.5 | — |
| 220F | (psi) | 384.53 | 362.59 | — |
| 240F | (psi) | 403.95 | 404.94 | — |
| 260F | (psi) | 414.33 | 403.58 | — |
| 280F | (psi) | 419.5 | 403.94 | — |
| Shrink Tension-TD[8] | | | | |
| 200F | (psi) | 545.16 | 598.97 | — |
| 220F | (psi) | 653.36 | 694.59 | — |
| 240F | (psi) | 713.21 | 710.32 | — |
| 260F | (psi) | 610.27 | 650.3 | — |
| 280F | (psi) | 491.26 | 552.61 | — |
| Free Shrink-LD | | | | |
| 200F | (%) | 13 | 12 | 13 |
| 220F | (%) | 28 | 25 | 25 |
| 240F | (%) | 62 | 60 | 62 |
| 260F | (%) | 79 | 79 | 80 |
| 280F | (%) | 80 | 80 | 80 |
| Free Shrink-TD | | | | |
| 200F | (%) | 20 | 19 | 20 |
| 220F | (%) | 38 | 34 | 36 |
| 240F | (%) | 67 | 65 | 66 |
| 260F | (%) | 80 | 80 | 80 |
| 280F | (%) | 79 | 81 | 80 |
| Instrumented Impact | | | | |
| Peak Load | (N) | 86.3 | 96.06 | — |
| Energy to Break | (J) | 0.73 | 0.88 | — |
| Gauge | (mil) | 0.565 | 0.565 | 0.60 |
| Peak Load Per Mil | (N/mil) | 152.7 | 170.0 | 170.0 |
| Energy To Break Per Mil | (J/mil) | 1.29 | 1.56 | 1.55 |
| Haze | (%) | 3.9 | 4 | 3.7 |
| Clarity | (%) | 84.6 | 85.3 | 80 |
| Gloss | (%) | 85 | 85 | 85 |
| Gauge | (mil) | 0.55 | 0.56 | 0.6 |

TABLE 7

| Example | | Co. 13 | Co. 14 | Co. 15 |
|---|---|---|---|---|
| Layer Ratio | | Monolayer | Monolayer | Monolayer |
| Skins | | None | None | None |
| Internal | | A8 | A16 | A17 |
| Instrumented Impact -TMLong | | | | |
| Peak Load | (N) | 98.12 | 46.33 | 75.17 |
| Energy to Break | (J) | 0.75 | 0.34 | 0.56 |
| Gauge | (mil) | 1.035 | 0.847 | 0.99 |
| Peak Load Per Mil | (N/mil) | 94.8 | 54.7 | 75.93 |
| Energy To Break Per Mil | (J/mil) | 0.725 | 0.401 | 0.566 |

**Co. 13, Co. 14, and Co. 15 were not irradiated.

Film of the present invention, as well as the comparative films, were made by cast extrusion (for monolayer films) or coextrusion (for multilayer films) by techniques well known in the art. The films were quenched, irradiated by electron beam irradiation at a dosage of between 20 and 35 kiloGrays, and reheated to their orientation temperature, and then stretched by a conventional trapped bubble process. Films were stretched at a ratio of about 5:1 in each of the longitudinal and transverse directions.

Film of the present invention can be made by any suitable process, including coextrusion, lamination, extrusion coating, or corona bonding and are preferably made by tubular cast coextrusion, such as that shown in U.S. Pat. No. 4,551,380 [Schoenberg], herein incorporated by reference in its entirety. Bags made from the film can be made by any suitable process, such as that shown in U.S. Pat. No. 3,741,253 (Brax et al.), hereby incorporated by reference in its entirety. Side or end sealed bags can be made from single wound or double wound films.

Film of the present invention can be oriented by any suitable process, including a trapped bubble process or a simultaneous or sequential tenterframe process.

Film of the present invention can have any total thickness desired, so long as the film provides the desired properties for the particular packaging operation in which the film is used. Final film thicknesses can vary, depending on process, end use application, etc. Typical thicknesses range from 0.1 to 20 mils, preferably 0.2 to 15 mils, more preferably 0.3 to 10 mils, more preferably 0.3 to 5 mils, more preferably 0.3 to 2 mils, such as 0.3 to 1 mil.

Film of the present invention can have a tear propagation (ASTM 1938) of between 3 and 10 grams in either or both of the longitudinal and transverse directions.

Film of the present invention can have a haze value of between 0.1 and 5, more preferably between 0.1 and 4.5, more preferably between 0.1 and 4, more preferably between 0.1 and 3.5, more preferably between 0.1 and 3, more preferably between 0.1 and 2.5, and most preferably between 0.1 and 2. Film of the invention can have a haze value of 5 or less than 5, 4 or less than 4, 3.5 or less than 3.5, 3 or less than 3, 2.5 or less than 2.5, 2 or less than 2, or 1 or less than 1.

The multilayer film of the present invention can have a peak load/mil value (ASTM D3763-95a) of at least 155, more preferably at least 160, more preferably at least 165, more preferably at least 167, more preferably at least 170, more preferably at least 175, more preferably at least 180, more preferably at least 185, more preferably at least 190, and most preferably at least 195 newtons/mil. Preferred ranges for peak load/mil are between 155 and 400, more preferably between 155 and 390, more preferably between 160 and 380, more preferably between 165 and 370, more preferably between 167 and 360, more preferably between 170 and 350, more preferably between 175 and 340, more preferably between 180 and 330, more preferably between 185 and 320, more preferably between 190 and 310, and most preferably between 195 and 300 newtons/mil.

The polymeric components used to fabricate film according to the present invention can also contain appropriate amounts of other additives normally included in such compositions. These include slip agents, antioxidants, fillers, dyes, pigments, radiation stabilizers, antistatic agents, elastomers, and other additives known to those of skill in the art of packaging films.

The multilayer film of the present invention can have an energy to break/mil value (ASTM D3763-95a) of at least 1.28, more preferably at least 1.30, more preferably at least 1.35, more preferably at least 1.40, more preferably at least 1.45, more preferably at least 1.50, more preferably at least 1.55, more preferably at least 1.58, more preferably at least 1.60, more preferably at least 1.65, more preferably at least 1.70, more preferably at least 1.75, more preferably at least 1.80, more preferably at least 1.85, and most preferably at least 1.90 Joules/mil. Preferred ranges for energy to break per mil are between 1.28 and 4.00, preferably between 1.30 and 3.00, more preferably between 1.35 and 3.00, more preferably between 1.40 and 2.90, more preferably between 1.45 and 2.85, more preferably between 1.50 and 2.85, more preferably between 1.55 and 2.80, more preferably between 1.60 and 2.75, more preferably between 1.65 and 2.75, more preferably between 1.70 and 2.75, more preferably between 1.75 and 2.75, and most preferably between 1.80 and 2.50 Joules/mil.

The multilayer film of the present invention exhibits a tensile strength (ASTM D 882-95) of preferably at least 18,000, more preferably at least 19,000, more preferably at least 20,000, more preferably at least 21,000, more preferably at least 21,500, more preferably at least 22,000, more preferably at least 22,500, and most preferably at least 23,000 psi in either or both of the longitudinal and transverse directions, and preferably in both the longitudinal and transverse directions. Preferred ranges for tensile strength are between 18,000 to 200,000, and more preferably between 23,000 and 100,000 psi in either or both of the longitudinal and transverse directions, and preferably in both the longitudinal and transverse directions.

The multilayer film of the present invention exhibits a free shrink (ASTM D 2732-83) at a temperature of 200° F. of preferably at least 8%, more preferably at least 9%, more preferably at least 10%, more preferably at least 11 %, more preferably at least 13%, and most preferably at least 15% in either or both of the longitudinal and transverse directions, and preferably in both the longitudinal and transverse directions. Preferred ranges for free shrink at a temperature of 200° F. are between 8% and 50%, more preferably between 10% and 45%, more preferably between 15% and 40% in either or both of the longitudinal and transverse directions, and preferably in both the longitudinal and transverse directions.

The multilayer film of the present invention exhibits a composite free shrink at a temperature of 200° F. of preferably at least 16%, more preferably at least 18%, more preferably at least 20%, more preferably at least 25%, and most preferably at least 30%. Preferred ranges for composite free shrink at a temperature of 200° F. are between 16% and 100%, more preferably between 20% and 90%, more preferably between 25% and 75%, and most preferably between 30% and 70%.

The multilayer film of the present invention exhibits a free shrink balance at a temperature of 240° F. (115° C.) of preferably less than or equal to 30%, more preferably less than 20%, more preferably less than 15%, more preferably less than 10%, and most preferably less than 5%. Preferred ranges for free shrink balance at a temperature of 240° F. are between 0% and 30%, more preferably between 0% and 20%, more preferably between 0% and 15%, more preferably between 0% and 10%, and most preferably between 0% and 5%.

The multilayer film of the present invention can be stretch oriented at stretching ratios of preferably at least about 1.5:1, more preferably at least about 2:1, more preferably at least about 2.5:1, more preferably at least about 3:1, more preferably at least about 3.25:1, more preferably at least about 3.5:1, more preferably at least about 4:1, more preferably at least about 4.5:1, and most preferably at least about 5:1 in either or both of the longitudinal and transverse directions, and preferably in both the longitudinal and transverse directions. Preferred ranges for stretch orientation ratios are preferably between 1.5:1 and 8:1, more preferably between 3:1 and 7:1, and most preferably between 4:1 and 6:1 in either or both of the longitudinal and transverse directions, and preferably in both the longitudinal and transverse directions.

The multilayer film of the present invention is preferably crosslinked, by chemical means or, preferably, by irradiation such as by electron beam irradiation at a dosage of between 10 and 200, more preferably between 15 and 150, more preferably between 20 and 150, and most preferably between 20 and 100 kiloGray. Although the invention does not have to be irradiated, in a preferred embodiment, irradiation can be used to improve impact strength. IPN resins suitable for use in the present inventive films have a melt index of preferably between 0.1 and 1.4, more preferably between 0.3 and 1.3, more preferably between 0.4 and 1.2, most preferably between 0.5 and 1.0, such as between 0.6 and 1.0. Preferably, the film has a substantially balanced free shrink. Preferably, at least 50% by volume of the total film volume comprises a multicomponent ethylene/alpha-olefin interpenetrating network resin having a melt index less than 1.4.

In preferred IPN resins, the homogeneous component forms between 44% and 49% by weight of the resin, and the heterogeneous component forms between 51% and 56% by weight of the resin. In preferred IPN resins, the homogeneous component forms less than 50% by weight of the resin, and the heterogeneous component forms more than 50% by weight of the resin. In preferred IPN resins, the heterogeneous component has a melt index between 6 and 50 times greater than the melt index of the homogeneous component.

It is to be understood that variations of the present invention can be made without departing from the scope of the invention, which is not limited to the specific embodiments and examples disclosed herein.

What is claimed is:

1. A multilayer oriented heat shrinkable film comprising:
    a) an internal layer comprising a multicomponent ethylene/alpha-olefin interpenetrating network resin having a melt index less than 1.4, the resin comprising
        i) a homogeneous component having a melt index of less than 1, and a density of at least 0.91 grams/cubic centimeter, and
        ii) a heterogeneous component with a melt index of between 1.5 and 20; and
    b) outer layers comprising a polymeric resin; wherein the film has
        i) a haze value (ASTM D 1003-95) less than or equal to 5,
        ii) a peak load/mil value (ASTM D 3763-95a) of at least 155 newtons/mil, and
        iii) a free shrink (ASTM D 2732-83) at a temperature of 200° F. of at least 8% in either or both of the longitudinal and transverse directions.

2. The film of claim 1 wherein the multicomponent ethylene/alpha-olefin interpenetrating network resin having a melt index less than 1.4 is derived from a solution mixture of homogeneous ethylene/alpha-olefin and heterogeneous ethylene/alpha-olefin.

3. The film of claim 1 wherein the multicomponent ethylene/alpha-olefin interpenetrating network resin is produced from a solution polymerization of homogeneous ethylene/alpha-olefin and solvent combined with a solution polymerized heterogeneous ethylene/alpha-olefin.

4. The film of claim 1 wherein the homogeneous ethylene/alpha-olefin component is long chain branched.

5. The film of claim 1 wherein the outer layers each comprise a polymeric resin selected from the group consisting of i) ethylene/alpha olefin copolymer,
ii) ethylene/vinyl acetate copolymer,
iii) ethylene/alkyl acrylate copolymer,
iv) ethylene/acrylic acid copolymer,
vi) butylene polymer and copolymer,
vii) multicomponent ethylene/alpha-olefin interpenetrating network resin different in composition from the multicomponent ethylene/alpha-olefin interpenetrating network resin of the internal layer, and
viii) a blend of the multicomponent ethylene/alpha-olefin interpenetrating network resin of the internal layer with another polymeric resin.

6. The film of claim 1 wherein the film has a substantially balanced free shrink.

7. The film of claim 1 wherein at least 50% by volume of the total film volume comprises a multicomponent ethylene/alpha-olefin interpenetrating network resin having a melt index less than 1.4.

8. A multilayer oriented heat shrinkable film comprising:
a) an internal layer comprising polymeric resin;
b) first and second intermediate layers, each disposed on a respective opposite side of the internal layer, comprising multicomponent ethylene/alpha-olefin interpenetrating network resin having a melt index less than 1.4, the resin comprising
   i) a homogeneous component having a melt index of less than 1, and a density of at least 0.91 grams/cubic centimeter, and
   ii) a heterogeneous component with a melt index of between 1.5 and 20; and
c) first and second outer layers, disposed on the first and second intermediate layers respectively, comprising a polymeric resin; wherein the film has
   i) a haze value (ASTM D 1003-95) less than or equal to 5,
   ii) a peak load/mil value (ASTM D 3763-95a) of at least 155 newtons/mil, and
   iii) a free shrink (ASTM D 2732-83) at a temperature of 200° F. of at least 8% in either or both of the longitudinal and transverse directions.

9. The film of claim 8 wherein the multicomponent ethylene/alpha-olefin interpenetrating network resin having a melt index less than 1.4 is derived from a solution mixture of homogeneous ethylene/alpha-olefin and heterogeneous ethylene/alpha-olefin.

10. The film of claim 8 wherein the multicomponent ethylene/alpha-olefin interpenetrating network resin is produced from a solution polymerization of homogeneous ethylene/alpha-olefin and solvent combined with a solution polymerized heterogeneous ethylene/alpha-olefin.

11. The film of claim 8 wherein the homogeneous ethylene/alpha-olefin component is long chain branched.

12. The film of claim 8 wherein the internal and outer layers each comprise a polymeric resin selected from the group consisting of
   i) ethylene/alpha olefin copolymer,
   ii) ethylene/vinyl acetate copolymer,
   iii) ethylene/alkyl acrylate copolymer,
   iv) ethylene/acrylic acid copolymer,
   v) propylene polymer and copolymer,
   vi) butylene polymer and copolymer,
   vii) multicomponent ethylene/alpha-olefin interpenetrating network resin different in composition from the multicomponent ethylene/alpha-olefin interpenetrating network resin of the internal layer, and
   viii) a blend of the multicomponent ethylene/alpha-olefin interpenetrating network resin of the internal layer with another polymeric resin.

13. The film of claim 8 wherein the intermediate layers can each further comprise a polymeric resin selected from the group consisting of
   i) ethylene/alpha olefin copolymer,
   ii) ethylene/vinyl acetate copolymer,
   iii) ethylene/alkyl acrylate copolymer,
   iv) ethylene/acrylic acid copolymer,
   v) propylene polymer and copolymer,
   vi) butylene polymer and copolymer, and
   vii) a second multicomponent ethylene/alpha-olefin interpenetrating network resin.

14. The film of claim 8 wherein the film has a substantially balanced free shrink.

15. The film of claim 8 wherein at least 50% by volume of the total film volume comprises a multicomponent ethylene/alpha-olefin interpenetrating network resin having a melt index less than 1.4.

16. A solid state oriented heat shrinkable film comprising:
a) between 50 and 100 percent, by volume of the total film, of a multicomponent ethylene/alpha-olefin interpenetrating network resin having a melt index less than 1.4, the resin comprising
   i) a homogeneous component having a melt index of less than 1, and a density of at least 0.91 grams/cubic centimeter, and
   ii) a heterogeneous component with a melt index of between 1.5 and 20; and
b) between 0 and 50 percent, by volume of the total film, of a polymeric resin; wherein the film has
   i) a haze value (ASTM D 1003-95) less than or equal to 5,
   ii) a peak load/mil value (ASTM D 3763-95a) of at least 155 newtons/mil, and
   iii) a free shrink (ASTM D 2732-83) at a temperature of 200° F. of at least 8% in either or both of the longitudinal and transverse directions.

17. The film of claim 16 wherein the film is a multilayer film.

18. The film of claim 16 wherein the polymeric resin is different in composition from the multicomponent ethylene/alpha-olefin interpenetrating network resin having a melt index less than 1.4.

19. The film of claim 16 wherein the film has a substantially balanced free shrink.

20. The film of claim 16 wherein at least 50% by volume of the total film volume comprises a multicomponent ethylene/alpha-olefin interpenetrating network resin having a melt index less than 1.4.

21. The film of claim 16 wherein the film comprises between 1% and 10% by volume of the total film, of the polymeric resin; and between 99% and 90%, by volume of the total film, of the multicomponent ethylene/alpha-olefin interpenetrating network resin having a melt index less than 1.4.

22. The film of claim 16 wherein the polymeric resin is selected from the group consisting of:
   i) ethylene/alpha olefin copolymer,
   ii) ethylene/vinyl acetate copolymer,
   iii) ethylene/alkyl acrylate copolymer,
   iv) ethylene/acrylic acid copolymer,
   v) propylene polymer and copolymer, and
   vi) butylene polymer and copolymer.

23. A multilayer oriented heat shrinkable film comprising:
a) an internal layer comprising a blend of a multicomponent ethylene/alpha-olefin interpenetrating network resin having a melt index less than 1.4, and ethylene polymer or copolymer having a density of at least 0.935 grams/cubic centimeter, wherein the multicomponent ethylene/alpha-olefin interpenetrating network resin having a melt index less than 1.4 comprises
   i) a homogeneous component having a melt index of less than 1, and a density of at least 0.91 grams/cubic centimeter, and
   ii) a heterogeneous component with a melt index of between about 1.0 and 20; and
b) outer layers comprising a polymeric resin; wherein the film has
   i) a haze value (ASTM D 1003-95) less than or equal to 5,
   ii) a peak load/mil value (ASTM D 3763-95a) of at least 155 newtons/mil, and
   iii) a free shrink (ASTM D 2732-83) at a temperature of 200° F. of at least 8% in either or both of the longitudinal and transverse directions.

24. The film of claim 23 wherein the multicomponent ethylene/alpha-olefin interpenetrating network resin having a melt index less than 1.4 is derived from a solution mixture of homogeneous ethylene/alpha-olefin and heterogeneous ethylene/alpha-olefin.

25. The film of claim 23 wherein the multicomponent ethylene/alpha-olefin interpenetrating network resin is produced from a solution polymerization of homogeneous ethylene/alpha-olefin and solvent combined with a solution polymerized heterogeneous ethylene/alpha-olefin.

26. The film of claim 23 wherein the homogeneous ethylene/alpha-olefin component is long chain branched.

27. The film of claim 23 wherein the outer layers each comprise a polymeric resin selected from the group consisting of
   i) ethylene/alpha olefin copolymer,
   ii) ethylene/vinyl acetate copolymer,
   iii) ethylene/alkyl acrylate copolymer,
   iv) ethylene/acrylic acid copolymer,
   v) propylene polymer and copolymer,
   vi) butylene polymer and copolymer,
   vii) multicomponent ethylene/alpha-olefin interpenetrating network resin different in composition from the multicomponent ethylene/alpha-olefin interpenetrating network resin of the internal layer, and
   viii) a blend of the multicomponent ethylene/alpha-olefin interpenetrating network resin of the internal layer with another polymeric resin.

28. The film of claim 23 wherein the film has a substantially balanced free shrink.

29. The film of claim 23 wherein at least 50% by volume of the total film volume comprises a multicomponent ethylene/alpha-olefin interpenetrating network resin having a melt index less than 1.4.

* * * * *

UNITED STATES PATENT AND TRADEMARK OFFICE
CERTIFICATE OF CORRECTION

PATENT NO. : 6,423,421 B1
DATED : July 23, 2002
INVENTOR(S) : Banaszak et al.

It is certified that error appears in the above-identified patent and that said Letters Patent is hereby corrected as shown below:

Column 19,
Line 5, insert -- v) propylene polymer and copolymer --

Signed and Sealed this

Twenty-sixth Day of August, 2003

JAMES E. ROGAN
*Director of the United States Patent and Trademark Office*